J. Brinkerhoff,
Fly Wheel.
Nº 38,025.    Patented Mar. 31, 1863.
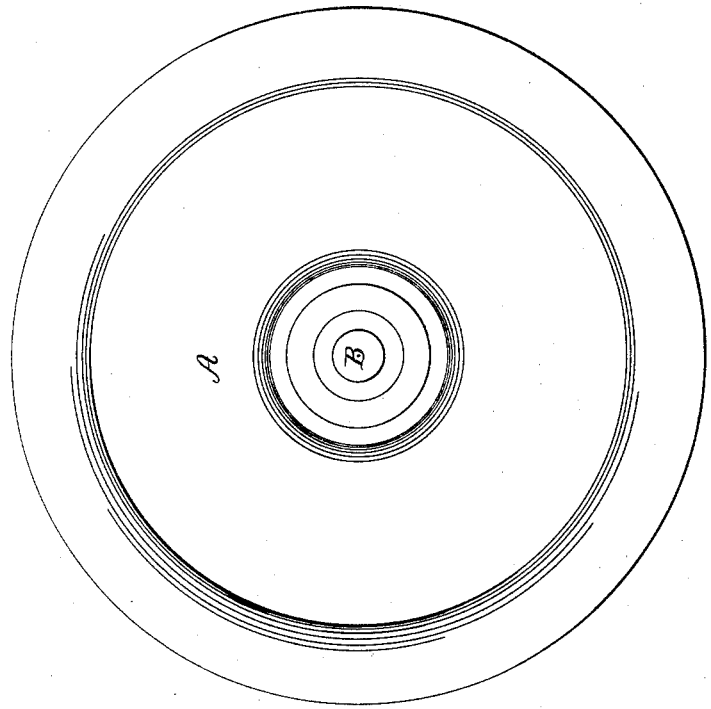
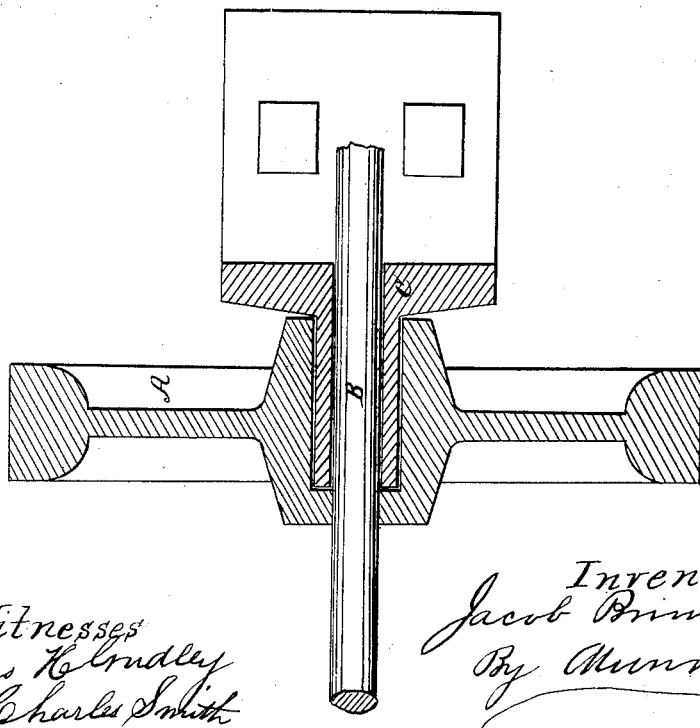
Witnesses
James H. Lindley
Charles Smith
Inventor
Jacob Brinkerhoff
By Munn & Co
Attys

UNITED STATES PATENT OFFICE.

JACOB BRINKERHOFF, OF AUBURN, NEW YORK.

IMPROVED MODE OF HANGING BALANCE-WHEELS, &c.

Specification forming part of Letters Patent No. 38,025, dated March 31, 1863.

*To all whom it may concern:*

Be it known that I, JACOB BRINKERHOFF, of Auburn, in the county of Cayuga and State of New York, have invented a new and Improved Mode of Hanging Balance, Belt, and Gear Wheels; and I do hereby declare that the following is a full, clear, and exact description of the same, reference being had to the accompanying drawings, making part of this specification, in which—

Figure 1 represents a front end elevation of my invention applied to the hanging of a balance-wheel. Fig. 2 represents a sectional elevation of the same.

Similar letters of reference indicate corresponding parts in the two figures.

This invention consists in a peculiar manner of hanging balance-wheels, gear-wheels, and pulleys, whereby they are supported independently of the shaft to which they are attached, relieving the latter of all lateral strain, and thereby lessening the usual tendency of the shaft-bearing adjacent to the wheel wearing away more rapidly than those more remote, as will be hereinafter fully explained.

To enable others skilled in the art to which my invention appertains to fully understand and use the same, I will proceed to describe it.

A represents the usual fly or balance wheel, which may be of cast, wrought, or malleable iron, or of any other suitable material. This wheel is first bored out in the usual manner, of a size to correspond with the shaft B, upon which it is to be secured by keys, set-screws, or otherwise. The hole on one side is now enlarged or made of a greater diameter by boring, or it may be done with a tool in a turning-lathe, or in any other proper manner. This enlargement of the hole constitutes a cylindrical countersink which extends nearly through the hub, leaving but a small thickness of metal between its outer end and the countersink, by means of which the attachment of the wheel to the shaft is made. The shaft is fitted to the metal box C, which serves the double purpose of a journal-bearing for the shaft and a stud-shaft for the fly or balance wheel to run on.

In the accompanying drawings the box is offset on one side or made in the form of a knee, for the purpose of affording a means of attachment to an upright of a building by bolts, as shown in Fig. 2.

Instead of the box being offset, as above, it may be cast with arms the same as the ordinary hanger and attached in the same way.

It will be observed from looking at the drawing that the shaft and fly-wheel have independent bearings.

By this mode of hanging balance, gear, and other kinds of wheels the shaft to which they are attached is relieved of all lateral strain in consequence of the wheel being supported wholly by the box instead of by the shaft.

The above invention is so simple and so clearly shown in the drawings as to render a further description unnecessary.

Having thus described my invention, what I claim as new, and desire to secure by Letters Patent, is—

The manner herein described of hanging fly or balance wheels, gear-wheels, and pulleys, so as to relieve the shaft to which they are attached from lateral strain, as and for the purpose specified.

The above specification of my improvement in hanging balance, fly, or belt wheels signed this 15th day of January, 1863.

JACOB BRINKERHOFF.

Witnesses:
M. G. DEVOE,
HORACE T. COOK.